United States Patent [19]

Melton

[11] 4,371,105
[45] Feb. 1, 1983

[54] CAM CONTROLLED MULTI-AXIS AUTOMATIC WELDING MACHINE

[76] Inventor: Vernon L. Melton, 1600 W. Main St., Washington, Mo. 63090

[21] Appl. No.: 171,453

[22] Filed: Jul. 23, 1980

[51] Int. Cl.³ .......................... B23K 37/02; B23K 9/12
[52] U.S. Cl. .......................................... 228/7; 74/469; 219/125.1; 228/32
[58] Field of Search .................. 228/7, 45, 4.5, 32; 219/125.1, 124.22; 74/469

[56] References Cited

U.S. PATENT DOCUMENTS

| | | | |
|---|---|---|---|
| 3,126,472 | 3/1964 | Brems | 219/124.22 |
| 3,132,617 | 5/1964 | Miller et al. | 228/7 |
| 3,970,232 | 7/1976 | Melton | 228/7 |
| 4,014,495 | 3/1977 | Oda et al. | 228/7 |
| 4,119,259 | 10/1978 | Sakamoto | 228/45 |
| 4,219,723 | 8/1980 | Maezawa et al. | 219/125.1 |

FOREIGN PATENT DOCUMENTS 590118 1/1978 U.S.S.R. .................... 228/7

Primary Examiner—Kenneth J. Ramsey
Attorney, Agent, or Firm—Rogers, Eilers & Howell

[57] ABSTRACT

A welding torch is supported by a mount which can be oscillated about a vertical pivot that is carried by and movable with an up-down frame which is carried by and movable with a forward-rearward frame that is carried by and movable with a laterally-movable frame. As a result, that welding torch can be oscillated about a pivot which is movable vertically, forwardly and rearwardly and from side to side. A plurality of cams are mounted adjacent each other and act through linkages to provide any desired individual or combined oscillation, up-down, forward-rearward, or lateral movement of that welding torch.

16 Claims, 27 Drawing Figures

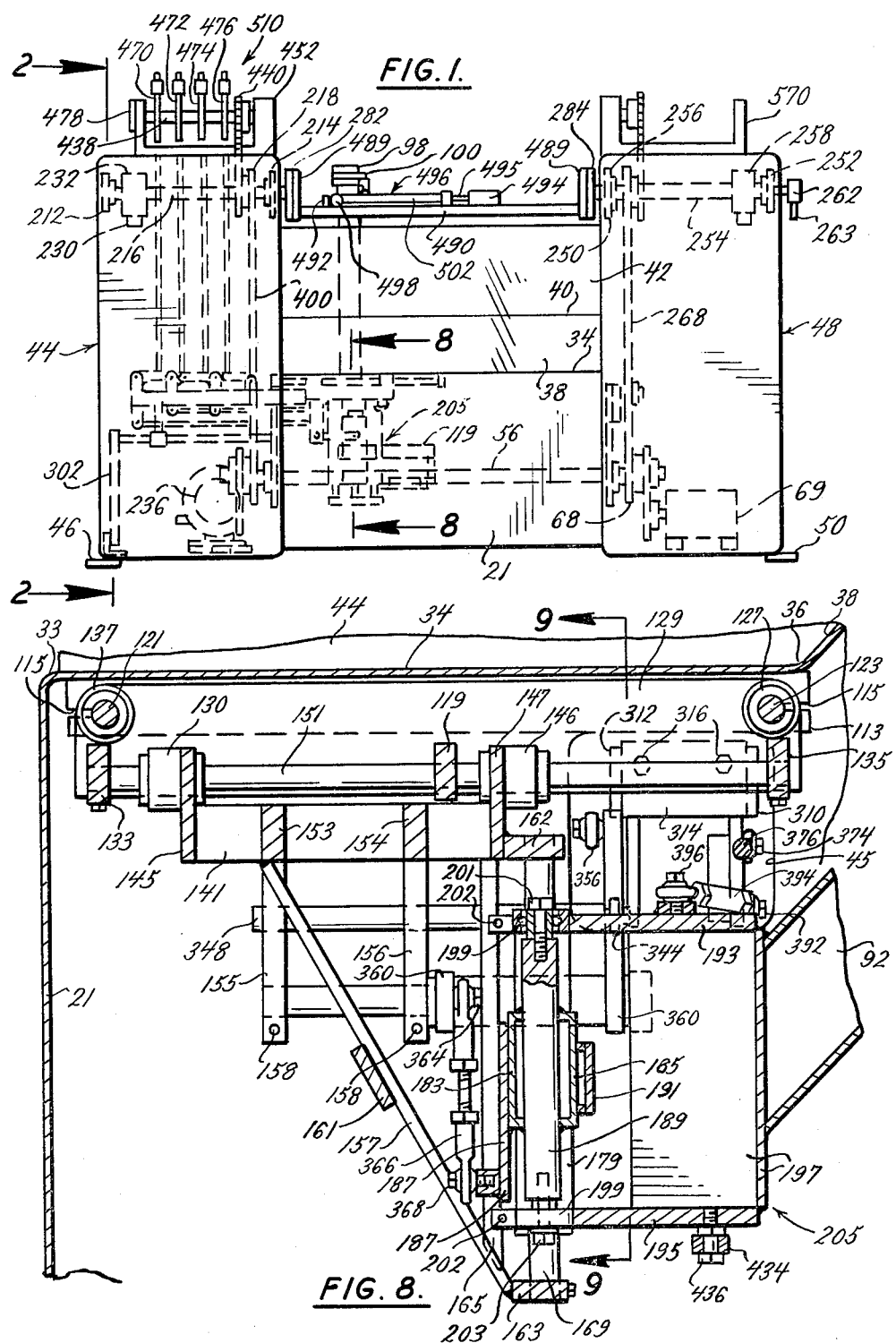

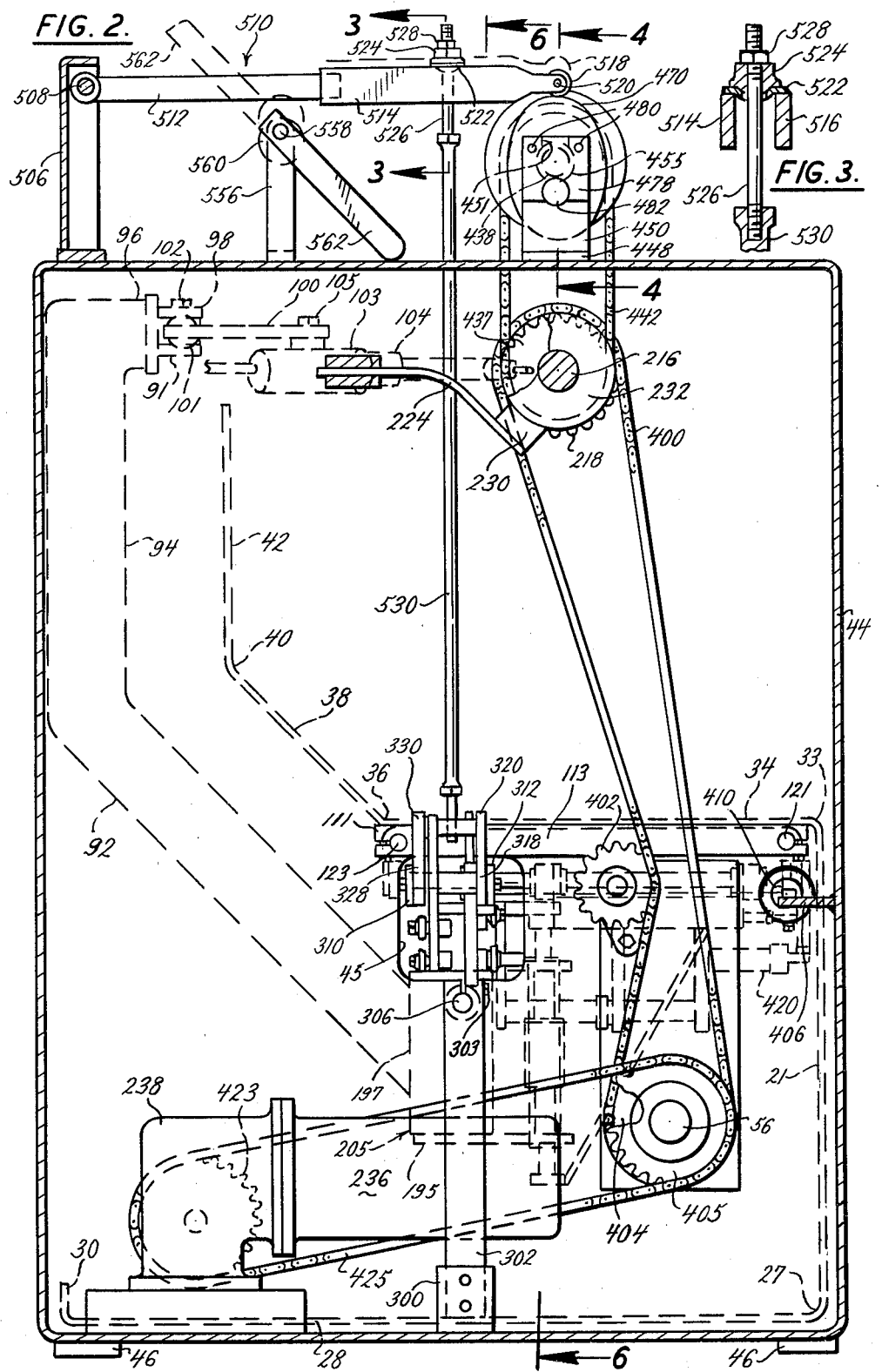

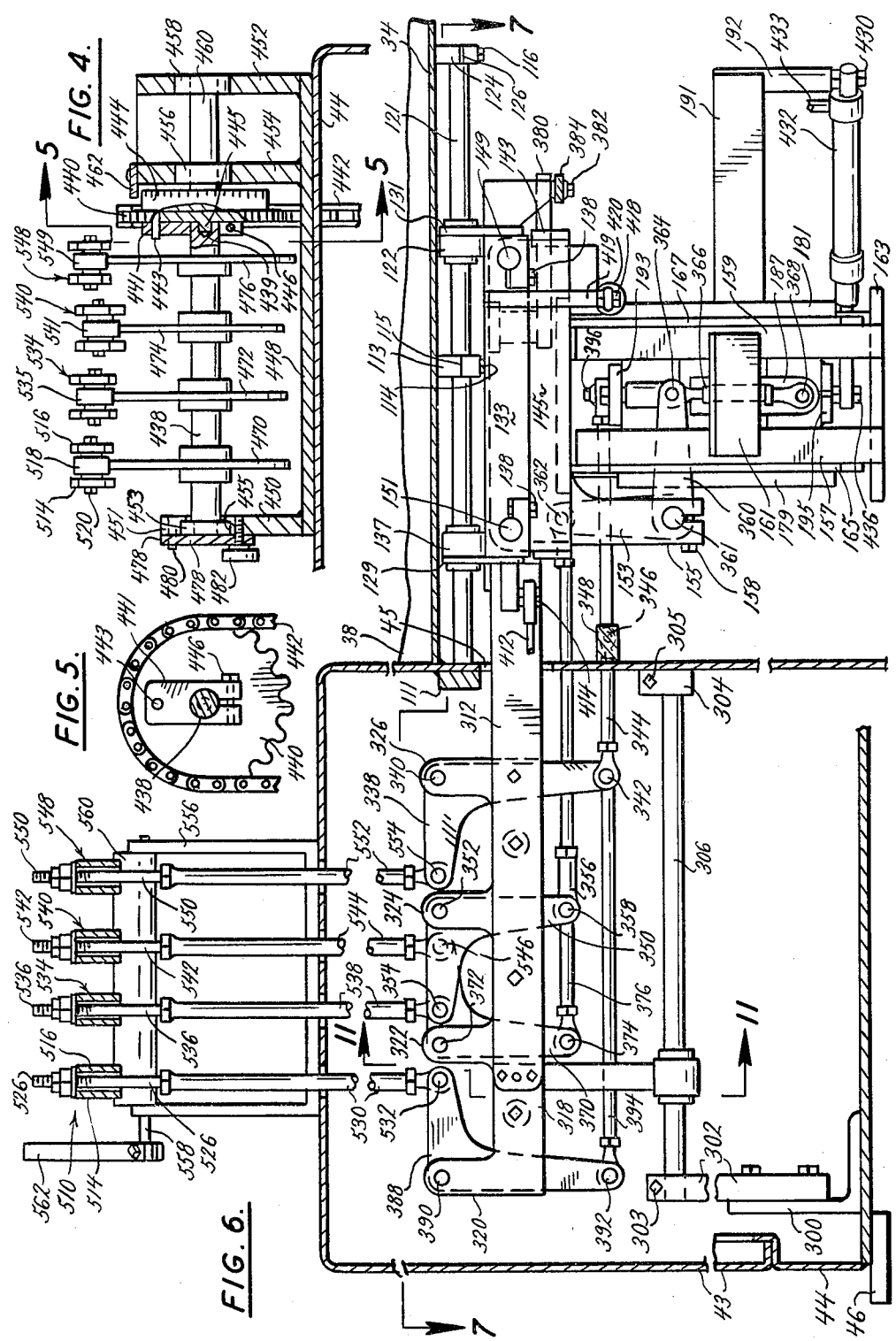

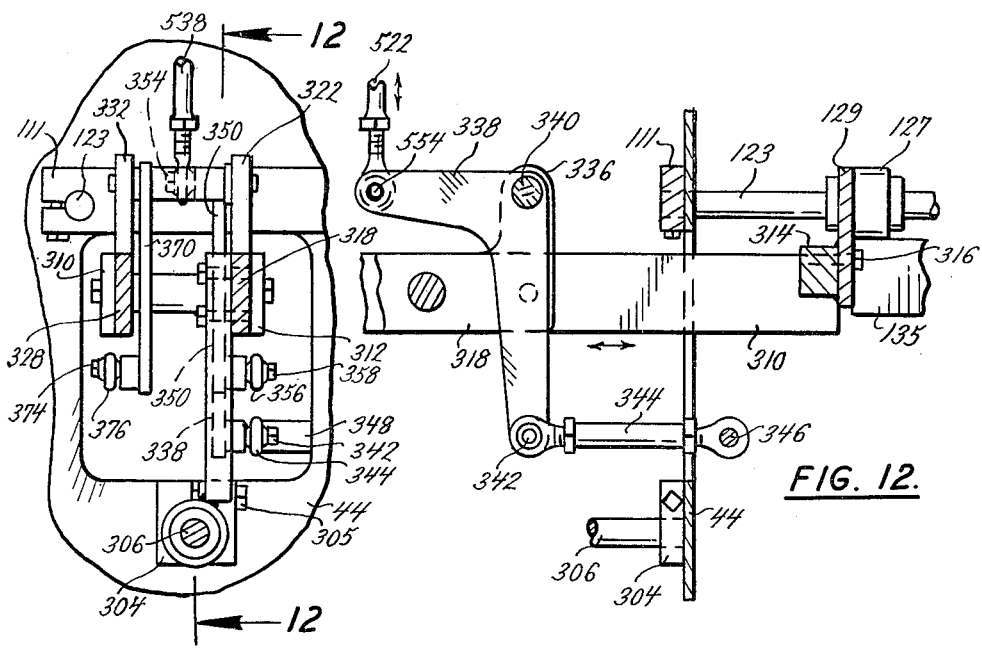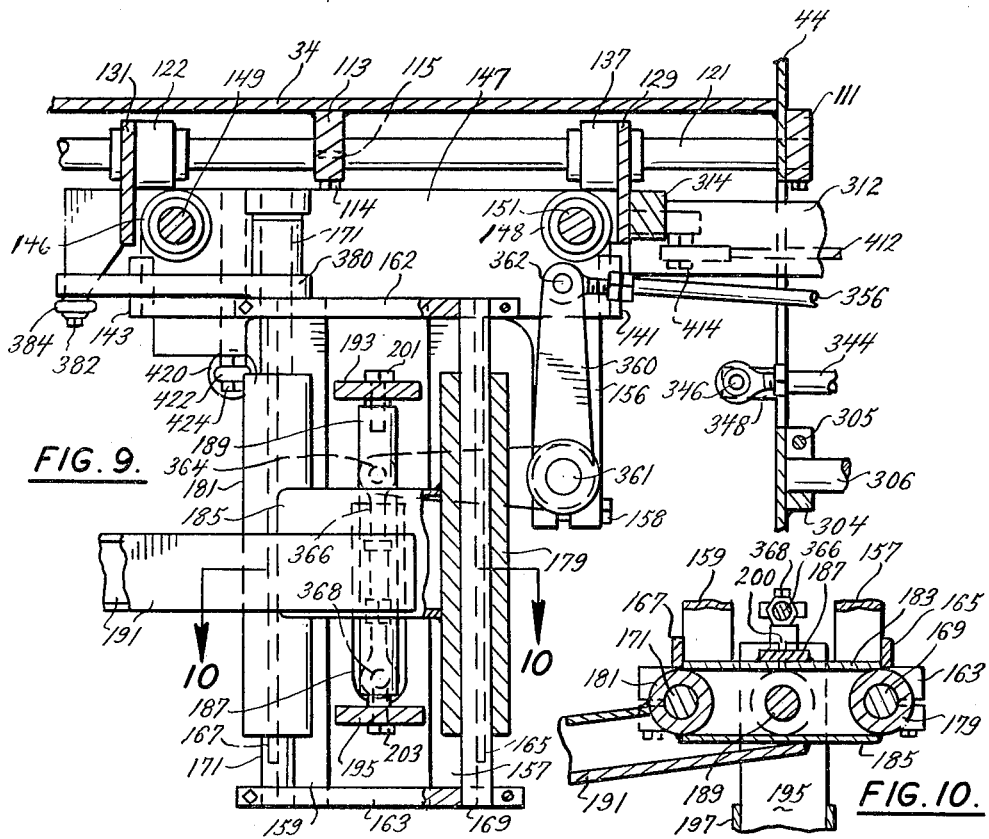

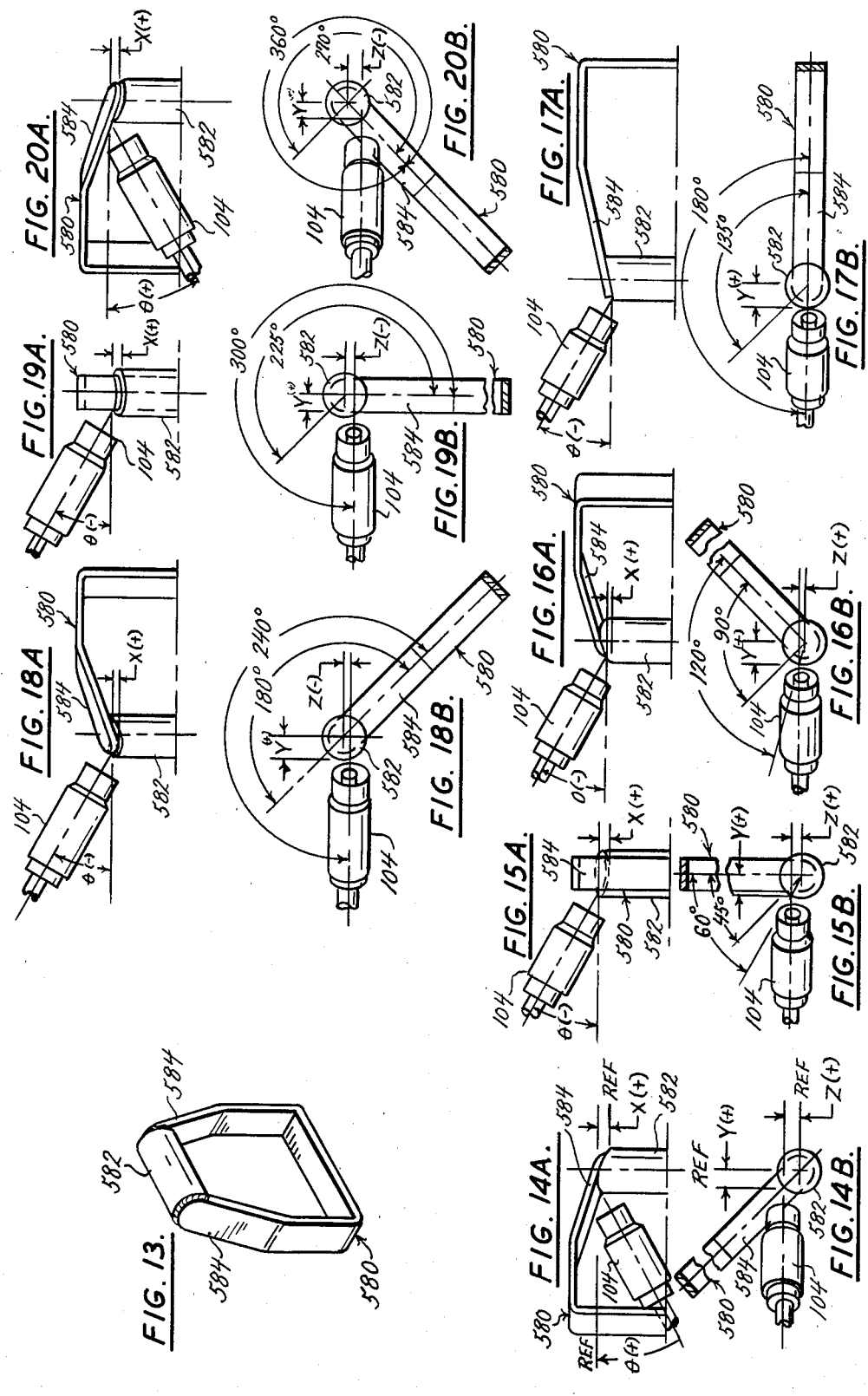

CAM CONTROLLED MULTI-AXIS AUTOMATIC WELDING MACHINE

BACKGROUND OF THE INVENTION

Some welding operations require a welding torch to be oscillated about an axis while also being moved vertically, forwardly or rearwardly, and laterally. In my U.S. Pat. No. 3,970,232, a welding machine is disclosed which provides cam-controlled oscillation of a welding torch about a generally-vertical axis while also providing cam-controlled forward-rearward movement of that torch. The welding machine of that patent is very useful and successful, but it does not provide vertical movement of the torch relative to the workpiece, and it also does not provide cam-controlled lateral movement of that torch. My co-pending application Ser. No. 19,764, which was filed on Mar. 12, 1979 for a WELDING MACHINE and which issued as U.S. Pat. No. 4,248,371, discloses cam-controlled oscillation of a welding torch about a generally-vertical axis and cam-controlled up-down and forward-rearward movement of that torch. The welding machine of said application is very useful and successful; but the forward-rearward movement is arcuate rather than linear, and the up-down movement is along an axis which tilts relative to the vertical. As a result, the designing of cams for different workpieces requires the designer to compensate for the non-linear forward-rearward movement and for the non-vertical up-down movement of the welding torch. Also, that application does not disclose cam-controlled lateral movement of the welding torch.

SUMMARY OF THE INVENTION

The welding machine of the present invention supports a welding torch on a mount which can be oscillated about a vertically-directed axis while being moved up and down relative to a forward-rearward frame that is movable forwardly and rearwardly relative to a laterally-movable frame. Separate cams are provided to (a) control the oscillation of the welding torch about the vertical axis, (b) to move that torch up and down, (c) to move that torch from side to side, and (d) to move that torch forwardly and rearwardly. As a result, precise cam-controlled oscillation of that torch can be attained while that torch is being held or moved precisely by cams along any one of three orthogonal axes. It is, therefore, an object of the present invention to provide a mount for a welding torch which can be oscillated in a precise manner about a vertical axis while also being movable up and down, forwardly and rearwardly, and laterally in precise fashion by cams.

A plurality of cams are variously connected to the mount for the welding torch, to the up-down frame, to the forward-rearward frame, and to the laterally-movable frame by elongated links and bell-crank levers. Those links and levers are movable substantially independently of each other; and hence each cam can provide precisely-controlled movement of the welding torch substantially independently of, or simultaneously with, movement of that torch due to one or more of the other cams. As a result, the designing of the "rises", "dwells" and "falls" for those cams is far easier than is the design of "rises", "dwells" and "falls" of cams where the movement due to one cam is dependent upon, or modifies, movement due to another cam. It is, therefore, an object of the present invention to provide a plurality of cams that are variously connected to the mount for a welding torch, to the up-down frame, to the forward-rearward frame, and to the laterally-movable frame for that torch by substantially independently-movable elongated links and bell crank levers.

Other and further objects and advantages of the present invention should become apparent from an examination of the drawing and accompanying description.

In the drawing and accompanying description a preferred embodiment of the present invention is shown and described, but it is to be understood that the drawing and accompanying description are for the purpose of illustration only and do not limit the invention and that the invention will be defined by the appended claims.

BRIEF DESCRIPTION OF THE DRAWING

FIG. 1 is a front elevational view, on a small scale, of one preferred embodiment of welding machine that is made in accordance with the principles and teachings of the present invention;

FIG. 2 is a sectional view, on a larger scale, that is taken along the plane indicated by the line 2—2 in FIG. 1;

FIG. 3 is a sectional view, on a still larger scale, that is taken along the plane indicated by the line 3—3 in FIG. 2;

FIG. 4 is a sectional view, on a scale intermediate those of FIGS. 2 and 3, that is taken along the plane indicated by the line 4—4 in FIG. 2;

FIG. 5 is a sectional view, on the scale of FIG. 4, that is taken along the plane indicated by the line 5—5 in FIG. 4;

FIG. 6 is a sectional view, on a scale intermediate those of FIGS. 2 and 3, that is taken along the plane indicated by the line 6—6 in FIG. 2;

FIG. 8 is a sectional view, on a still larger scale, that is taken along the plane indicated by the line 8—8 in FIG. 1;

FIG. 9 is a sectional view, on the scale of FIG. 8, that is taken along the plane indicated by the line 9—9 in FIG. 8;

FIG. 10 is a sectional view, on the scale of FIG. 8, that is taken along the plane indicated by the line 10—10 in FIG. 9;

FIG. 11 is a sectional view, on a larger scale, that is taken along the broken plane indicated by the broken line 11—11 in FIG. 6;

FIG. 12 is a sectional view, on the scale of FIG. 11, that is taken along the broken plane indicated by the broken line 12—12 in FIG. 11;

FIG. 13 is a perspective view of a metal stirrup for a saddle;

FIG. 14A is a plan view which shows a welding torch and one-half of that stirrup with that half-stirrup inclining upwardly from right to left at an angle of forty-five degrees;

FIG. 14B is a partially-sectioned elevational view of the torch and half-stirrup in the positions of FIG. 14A;

FIG. 15A is a plan view of the torch and half-stirrup after that half-stirrup has been rotated forty-five degrees in the clockwise direction from the position of FIG. 14A;

FIG. 15B is a partially-sectioned elevational view of the torch and half-stirrup in the positions of FIG. 15A;

FIG. 16A is a plan view of the torch and half-stirrup after that half-stirrup has been rotated ninety degrees in the clockwise direction from the position of FIG. 14A;

FIG. 16B is a partially-sectioned elevational view of the torch and half-stirrup in the positions of FIG. 16A;

FIG. 17A is a plan view of the torch and half-stirrup after that half-stirrup has been rotated one hundred and thirty-five degrees in the clockwise direction from the position of FIG. 14A;

FIG. 17B is a partially-broken elevational view of the torch and half-stirrup in the positions of FIG. 17A;

FIG. 18A is a plan view of the torch and half-stirrup after that half-stirrup has been rotated one hundred and eighty degrees in the clockwise direction from the position of FIG. 14A;

FIG. 18B is a partially-sectioned elevational view of the torch and half-stirrup in the positions of FIG. 18A;

FIG. 19A is a plan view of the torch and half-stirrup after that half-stirrup has been rotated two hundred and twenty-five degrees in the clockwise direction from the position of FIG. 14A;

FIG. 19B is a partially-sectioned elevational view of the torch and half-stirrup in the positions of FIG. 19A;

FIG. 20A is a plan view of the torch and half-stirrup after that half-stirrup has been rotated two hundred and seventy degrees in the clockwise direction from the position of FIG. 14A; and FIG. 20B is a partially-sectioned elevational view of the torch and half-stirrup in the positions of FIG. 20A.

DESCRIPTION OF THE PREFERRED EMBODIMENT

Figure 7:
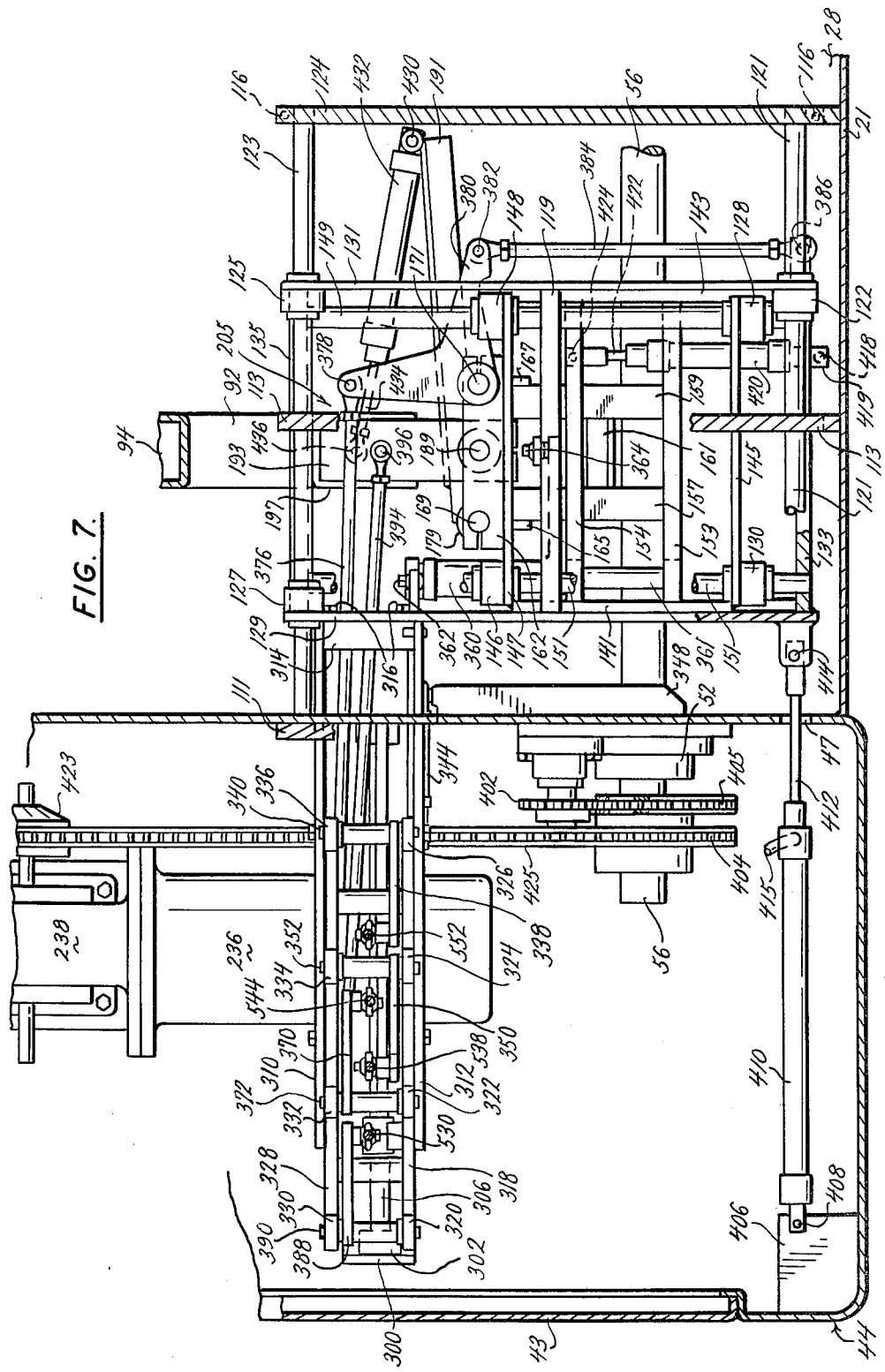
FIG. 7 is a sectional view, on the scale of FIG. 6, that is taken along the broken plane indicated by the broken line 7—7 in FIG. 6.

Referring particularly to FIG. 1, the numeral 44 denotes a prismatic enclosure which constitutes the left-hand portion of a welding machine that is made in accordance with the principles and teachings of the present invention. FIGS. 6 and 7 show a removable panel 43 that normally closes a large opening in the left-hand wall of that enclosure. The numeral 48 denotes a prismatic enclosure which is similar to the enclosure 44 and which constitutes the right-hand portion of that welding machine. Feet 46 underlie the enclosure 44; and feet 50 underlie the enclosure 48. A shaft 56 extends through openings in the confronting walls of the enclosures 44 and 48; and it is rotatably supported by bearings, not shown, that are held within a bearing housing 52 in enclosure 44 and by a similar bearing housing in enclosure 48. Openings 45 and 47 are provided in the right-hand wall of the enclosure 44, as shown by FIGS. 6 and 7.

A wide metal plate has a horizontal portion 28 as the bottom thereof, has a short upwardly-directed flange 30 at the rear edge of that portion, has a horizontally-directed portion 34 spaced above the portion 28, has a bend 36 at the rear edge of the portion 34, has a portion 38 which inclines upwardly and rearwardly from the bend 36, has a bend 40 at the upper edge of the inclined portion 38, and has a vertically-directed portion 42. The side edges of those portions of that metal plate are suitably welded to the confronting faces of the enclosures 44 and 48.

The numeral 91 in FIG. 2 denotes a movable plate that coacts with a fixed upper plate to constitute a clamp 98. Spherical recesses at the inner surfaces of those plates receive a ball 101 at the rear end of a supporting plate 100. That supporting plate is thin enough, relative to the space between the plates of clamp 98, to enable that supporting plate to be tilted at any desired angle and to be rotated to any desired position. Once the plate 100 has been given a desired position, set screws 102 can be tightened to urge the plates of clamp 98 into holding engagement with the ball 101. The clamp 98 extends forwardly from a horizontally-directed portion 96 of a non-linear arm which has a vertical portion 94 and a rearwardly-inclined portion 92. The numeral 103 denotes a split-sleeve holder for a welding torch 104; and that holder is secured to the plate 100 by a screw 105.

All of the foregoing components preferably are identical in structure and function to the similarly-numbered components of my said application. However, if desired, other components of generally-similar structure could be used.

The numeral 21 denotes the front portion of the wide metal plate which is disposed between, and which has the side edges thereof welded to, the confronting faces of the enclosures 44 and 48. A bend 27 interconnects the portion 21 with the horizontally-directed lower portion 28; and a bend 33 connects the portion 21 with the upper horizontally-directed portion 34 of that wide plate.

The numeral 113 in FIGS. 8 and 9 denotes an elongated bar which is welded to the underface of the horizontal portion 34 of the wide plate which extends between the confronting faces of the enclosures 44 and 48. That bar is parallel to, but is spaced to the left of, the inner face of enclosure 44. Cylindrical sockets are formed adjacent the opposite ends of the bar 113, and slots 115 extend inwardly from the ends of that bar to those sockets. Machine screws 114 span those slots, and can be tightened to cause those sockets to fixedly clamp elongated guide rods 121 and 123. As indicated particularly by FIG. 8, the guide rod 121 is close to the underface of the horizontal portion 34 of the wide plate, and also is close to the inner face of the vertically-directed portion 21 of that wide plate. The guide rod 123 is at the level of the guide rod 121; but it is located close to the bend 36 between the upper horizontal portion 34 and the inclined portion 38 of the wide plate. An elongated bar 111, which preferably is identical to the elongated bar 113, is welded to the inner surface of the confronting face of the enclosure 44. Machine screws at the opposite ends of the elongated bar 111 can be tightened to cause cylindrical sockets at the ends of that bar to solidly clamp the right-hand ends of the guide rods 121 and 123, as those guide rods are viewed in FIG. 9. A further elongated bar 124, which also is preferably identical to the elongated bar 113, is welded to the underface of the generally-horizontal portion 34 of the wide plate. Machine screws 116 adjacent the ends of the elongated bar 124 span slots 126 in those ends to cause cylindrical sockets to fixedly clamp the right-hand ends of the guide rods 121 and 123, as those guide rods are viewed in FIG. 7. As a result, those guide rods are fixedly held parallel relative to each other and close to the undersurface of the horizontal portion 34 of the wide plate which is welded to, and which spans the space between, the confronting faces of the enclosures 44 and 48.

The numerals 122 and 125 denote sleeves which are welded to an elongated plate 131 that has openings adjacent the opposite ends thereof to accommodate bushings which telescope over the guide rods 121 and 123 and which are fixedly held within the sleeves 122 and 125. The numerals 127 and 137 denote sleeves which are welded to an elongated plate 129 that has openings adjacent the opposite ends thereof to accommodate bushings which telescope over the guide rods 121 and 123 and which are fixedly held within the sleeves 127 and 137. An elongated bar 133 has the ends thereof welded to the confronting faces of the forward ends of the plates 129 and 131, as indicated by FIGS. 7 and 9. An elongated bar 119 has the ends thereof welded to the confronting faces of the mid portions of the plates 129 and 131, as indicated by FIG. 7; and an elongated bar 135 has the ends thereof welded to the inner faces of the rear portions of those plates, as indicated by FIGS. 6 and 7. As indicated by FIG. 6, cylindrical sockets are formed adjacent the ends of the elongated bars 119, 133 and 135, slots extend short distances inwardly from those cylindrical sockets, and further slots extend downwardly to the lower edges of those elongated bars. Machine screws 138 span those inwardly-directed slots to clamp guide rods 149 and 151 to the elongated bars 119, 133 and 135. Those guide rods coact with the elongated bars 119, 133 and 135 and with the plates 129 and 131 to define a rugged and sturdy open-type frame which is movable laterally relative to the enclosures 44 and 48 along an axis that is parallel to the guide rods 121 and 123.

The numeral 145 denotes a plate which is parallel to, and which is disposed intermediate, the elongated bars 133 and 119 of the laterally-movable frame; and openings adjacent the ends of that plate accommodate the guide rods 151 and 149. Sleeves 128 and 130 are welded to the front faces of the plate 145 in register with the openings adjacent the ends of that plate; and those sleeves fixedly hold bushings that telescope over the guide rods 149 and 151. The numeral 147 denotes a plate which is parallel to the plate 145 and which is disposed intermediate the elongated bars 119 and 135 of the laterally-movable frame. That plate has openings adjacent the ends thereof which accommodate the guide rods 149 and 151; and sleeves 146 and 148 are welded to the rear face of that plate in register with those openings. Those sleeves accommodate bushings which telescope over the guide rods 149 and 151. A side plate 141 is welded to the left-hand ends of the plates 145 and 147; and a plate 143 is welded to the right-hand ends of those plates. The plates 141, 143, 145 and 147 constitute the upper portion of an open-type rectangular frame which is confined for forward-rearward movement by the guide rods 149 and 151. As indicated by dotted lines in FIG. 6, the upper edges of the plates 145 and 147 are located just a short distance below the upper edges of the elongated bars 119, 133 and 135 of the laterally-movable frame. Generally L-shaped plates 153 and 154 extend between, and are welded to, the plates 141 and 143, as indicated by FIGS. 7 and 8. An elongated arm 155 of plate 153 extends downwardly below the level of the plate 141; and, similarly, an elongated arm 156 of plate 154 extends downwardly below the level of that plate. Those arms have cylindrical sockets adjacent the lower ends thereof; and machine screws 158 span slots, which extend to those sockets, to permit those sockets to be reduced in size. The numerals 157 and 159 denote elongated struts which incline downwardly and rearwardly from the plate 153; and the lower ends of those struts are welded to a bottom plate 163. Vertically-directed struts 165 and 167 extend downwardly from the plates 141 and 143 to, and are welded to, the sides of the struts 157 and 159 to form a triangular truss. A horizontal plate 161 extends between, and is welded to, the struts 157 and 159 to stiffen that truss. The numeral 162 denotes a plate which is welded to, and which extends rearwardly from, the lower edge of the plate 147; and the plate 162 is located above, and in register with, the plate 163. Guide rods 169 and 171 have the upper ends thereof clamped in cylindrical sockets adjacent the ends of the plate 162, and have the lower ends thereof clamped in cylindrical sockets adjacent the ends of the plate 163.

The plates 141, 143, 145, 147, 153, 154, 162 and 163, struts 157, 159, 165 and 167, brace 161, and guide rods 169 and 171 constitute a sturdy and rigid forward-rearward frame. That frame can be moved forwardly and rearwardly along a horizontal axis which is parallel to the guide rods 149 and 151.

The numeral 179 denotes a sleeve which encircles the guide rod 169, and the numeral 181 denotes a sleeve which encircles the guide rod 171. Short horizontally-directed channels 183 and 185 have the flanges thereof extending toward, and welded to, each other; and the ends of those channels are welded to the sleeves 179 and 181 to rigidly hold those sleeves in spaced parallel relation. The numeral 187 denotes a plate which extends downwardly from the channel 183 and which is located between the struts 165 and 167, as indicated particularly by FIG. 6. The lower end of that plate is semi-circular in elevation. The numeral 189 denotes a cylindrical rod which has threaded sockets in the upper and lower ends thereof, as indicated by FIG. 8; and that rod is rigidly held midway between the guide rods 169 and 171, as indicated particularly by FIG. 7. That cylindrical rod is parallel to, but is shorter than, each of those guide rods. A horizontally-directed strut 191 is welded to, and extends outwardly and rearwardly from, the channel 185, as indicated by FIGS. 6, 7, 9 and 10. A projection 192 extends downwardly from the outer end of that strut, as shown by FIG. 6. The channels 183 and 185, the sleeves 179 and 181, the cylindrical rod 189, and the strut 191 constitute a sturdy, up-down frame which can be moved upwardly and downwardly along a vertical axis that is parallel to the guide rods 169 and 171.

The numerals 193 and 195 denote the upper and lower plates of a mount 205 which includes a U-shaped channel 197 that has the upper and lower edges thereof welded to those plates. The forward ends of the plates 193 and 195 extend forwardly beyond the sides of the channel 197; and those forward ends have sockets therein which accommodate anti-friction bearings 199. Slots 200 extend forwardly from those sockets; and machine screws 202 span those slots to permit those sockets to be fixedly clamped to the outer races of those anti-friction bearings. The lower end of the inclined portion 92 of the non-linear torch arm is welded to, and is supported by, the web of the channel 197. Machine screws 201 and 203 extend through the inner races of the anti-friction bearings 199 to seat in the threaded sockets in the upper and lower ends of cylindrical rod 189. Those screws and those bearings permit rotation of the mount 205, and hence of the non-linear torch arm, about the vertical axis defined by cylindrical rod 189.

The mount 205 can be oscillated about a vertical axis, can be moved upwardly and downwardly with the up-down frame constituted by sleeves 179 and 181, channels 183 and 185, plate 187, rod 189 and strut 191, can be moved forwardly and rearwardly with the forward-rearward fame constituted by the plates 141, 143, 145, 147, 162 and 163, L-plates 153 and 154, struts 157, 159, 165 and 167, brace 161, and guide rods 169 and 171, and can be moved from side to side with the laterally-movable frame constituted by plates 129 and 131, bars 119, 133 and 135, and guide rods 149 and 151. As a result, that mount, and hence the welding torch 104, can be moved along three orthogonal axes while also being rotated about the vertical axis.

The numeral 212 in FIG. 1 denotes a pivot block which is fixedly secured to the left-hand wall of enclosure 44; and the numeral 214 denotes a similar pivot block which is secured to the right-hand wall of that enclosure. A shaft 216 is rotatably held by those pivot blocks, and a sprocket gear 218 and a face plate 282 are fixedly secured to that shaft; and that face plate supports one end of a workholding fixture 490. Those pivot blocks, that shaft and that sprocket gear preferably are identical in structure and function to the similarly-numbered components in my said application.

The numeral 224 denotes an arm which has the rear portion thereof fixedly held, and which has an electrical brush 230 secured to the forwardly and downwardly inclined front portion thereof. A slip ring 232 is secured to, and rotates with, the shaft 216. That arm, brush and slip ring provide a low resistance electrical path to the shaft 216 as in my U.S. Pat. No. 3,970,232.

The numeral 236 denotes an electric motor; and the numeral 238 denotes a gear box to which that motor is connected. That motor and gear box are mounted within the enclosure 44; and they preferably are identical in structure and function to the similarly-numbered components in my U.S. Pat. No. 3,970,232.

The numerals 250 and 252 in FIG. 1 denote pivot blocks that are mounted within the enclosure 48 to rotatably support a hollow shaft 254. A sprocket gear 256 is secured to that shaft; and a slip ring 258 also is secured to that shaft. Those pivot blocks, that shaft, that sprocket gear and that slip ring preferably are identical to similarly-numbered components in my said application. The numeral 262 denotes a rotation-enabling coupling which is mounted on the outer end of the shaft 254; and the numeral 263 denotes an air hose which is connected to that coupling. That air hose and that coupling can supply compressed air to a passageway defined by the hollow shaft 254. That coupling and air hose preferably are identical to that similarly-numbered components in my said application.

The numeral 268 denotes a sprocket chain within the enclosure 48. That sprocket chain meshes with, and drives, the sprocket gear 256. A sprocket gear 68 is mounted on that end of the shaft 56 which is disposed within the enclosure 48; and that sprocket gear will drive the sprocket chain 268. The numeral 69 denotes a drum-type switch that has a number of cams thereon which selectively operate switches. That drum switch can be used to control electrical devices which are to be operated at different times during each cycle of the welding machine.

The face plate 282 and 284 are mounted, respectively, on the confronting ends of the shafts 216 and a face plate 254. The numeral 490 denotes a welding fixture which has upstanding members 489 at the ends thereof that are securable to, and rotatable by, the face plates 282 and 284. That fixture has pneumatic cylinders 494 thereon with pistons 495 that can force a workpiece—generally denoted by the numeral 496—into holding engagement with a V-block 492. That workpiece can have many different configurations and, as shown by the drawing, can include a tubular piece 498 and a tubular piece 502 which are displaced ninety degrees and are to be welded together. The face plates 282 and 284, the fixture 490 with its ends 489, the V-block 492, and the pneumatic cylinders 494 preferably are identical to the similarly-numbered components in my said application.

Referring particularly to FIG. 6, the numeral 300 denotes an L-shaped bracket which is disposed within, and which is secured to the bottom of, the enclosure 44. An elongated vertical support 302, which is shown in full length in FIG. 2, is secured to the vertical portion of the bracket 300; and the upper end of that support has a cylindrical socket with a slot extending upwardly therefrom. A block 304 is secured to the right-hand wall of the enclosure 44; and it has a cylindrical socket therein which is in register with the socket in the upper end of the support 302. An elongated guide rod 306 has the ends thereof disposed within those cylindrical sockets; and a machine screw 303 in the upper end of the support 302 and a machine screw 305 in the block 304 fixedly clamp that guide rod in position.

The numeral 312 in FIGS. 6 and 7 denotes an elongated bar that is horizontally-directed and that extends through the opening 45 in the inner wall of enclosure 44, as shown by FIG. 6. A similar, horizontally-directed, elongated bar 310 is in register with, but is spaced a short distance rearwardly of, the bar 312. The numeral 314 denotes a block to which the inner ends of the bars 310 and 312 are secured, as by welding; and machine screws 316 secure that block, and hence those bars, to the plate 129 of the laterally-movable frame. The numeral 318 denotes a horizontally-directed, elongated bracket with horizontally-spaced, upwardly-extending arms 320, 322, 324 and 326; and the upper ends of those arms are semi-circular, as indicated by FIG. 6. The numeral 328 denotes a similar horizontally-directed, elongated bracket with horizontally-spaced, upwardly-extending arms 330, 332, 334 and 336; and the upper ends of those arms are semi-circular. The brackets 318 and 328 are identical to, and are in register with, each other; and they are secured to the confronting faces of the elongated bars 310 and 312 to dispose the arms 320 and 330 in register with each other, to dispose the arms 322 and 332 in register with each other, to dispose the arms 324 and 334 in register with each other, and to dispose the arms 326 and 336 in register with each other. The upper ends of those arms have openings therein which are aligned to provide four horizontally-displaced horizontally-directed axes.

The numeral 338 denotes a bell crank lever with an elongated hub; and a pivot 340 extends through that hub and through the openings in the upper ends of arms 326 and 336 to hold that bell crank lever between, and for movement relative to, the brackets 318 and 328. A pin 554 is carried by the end of the horizontally-directed arm of that lever; and a pin 342 connects the lower end of the downwardly-directed arm of that lever to one end of an adjustable-length link 344. The other end of that link is secured to an elongated mounting bar 348 by a pin 346; and that mounting bar is welded to the right-hand face of the inner wall of the enclosure 44, as indicated by FIGS. 6 and 9. The adjustable-length link 344 could be made in different ways; but preferably is made as an internally-threaded sleeve which has eye-bolts at each end thereof. Because the mounting bar 348 is fixedly secured to the enclosure 44, the adjustable-length link 344 will permit movement of the pin 342—and hence of the lower end of lever 338—in a generally-vertical direction along an arc which has the pin 346 as its center; but that link will prevent any appreciable lateral movement of the pin 342 and of the lower end of the lever 338. As shown particularly by FIG. 6, the horizontally-directed arm of lever 338 extends to the left from the pivot 340.

The numeral 350 denotes a bell crank lever with an elongated hub; and a pivot 352 extends through that hub and through the openings in the upper ends of arms 324 and 334 to hold that bell crank lever between, and for movement relative to, the brackets 318 and 328. The horizontally-directed arm of that lever extends to the left from the pivot 352; and it has a pin 354 in the end thereof. A pin 358 in the end of the downwardly-directed arm of that lever secures an adjustable-length link 356 to that lever; and the other end of that link is connected to the upwardly-extending arm of a bell crank lever 360 by a pin 362. The latter bell crank lever is rotatably mounted on an elongated pivot 361 that is held within sockets adjacent the lower ends of the downwardly-depending arms 155 and 156 of the members 153 and 154 of the forward-rearward frame. The machine screws 158 can be tightened to cause those sockets to tightly clamp the pivot 361. The horizontally-directed arm of lever 360 is connected to a vertically-directed, adjustable-length link 366 by a pin 364, as shown by FIGS. 6 and 9. The lower end of that link is connected to the plate 187 of the up-down frame by a pin 368.

The numeral 370 denotes a bell crank lever with an elongated hub; and a pivot 372 extends through that hub and through the openings in the upper ends of arms 322 and 332 to hold that bell crank lever between, and for movement relative to, the brackets 318 and 328. The horizontally-directed arm of lever 370 extends to the right from the pivot 372 and carries a pin 546. The downwardly-directed arm of that lever is connected to an adjustable-length link 376 by a pin 374. The other end of that adjustable-length link is connected to the rearwardly-extending arm of a horizontally-disposed bell crank lever 380 by a pin 378, all as indicated particularly by FIG. 7. The lever 380 is rotatably secured to the forward-rearward frame by an upward extension of the guide rod 171 which serves as a pivot for that lever. A pin 382 connects the right-hand arm of lever 380 to the rear end of a horizontally-extending adjustable-length link 384 which has the forward end thereof secured to the laterally-movable frame by a pin 386. The rear end of the link 384 will be able to move about an arc which has the pin 386 as the center thereof, but it will not be able to move any appreciable distance in the forward-rearward direction relative to the laterally-movable frame. As a result, the right-hand end of the lever 380 will not be able to move any appreciable distance in the forward-rearward direction relative to that frame.

The numeral 388 denotes a bell crank lever with an elongated hub; and a pivot 390 extends through that hub and through the openings in the upper ends of arms 320 and 330 to hold that bell crank lever between, and for movement relative to, the brackets 318 and 328. The horizontally-directed arm of that lever extends to the right from the pivot 390; and it carries a pin 532 in the end thereof. A pin 392 connects the end of the vertically-directed arm of that lever to an adjustable-length link 394 which has the other end thereof secured to the upper plate 193 of mount 205 by a pin 396, as shown by FIG. 7.

The numeral 400 denotes a sprocket chain which is disposed within the enclosure 44 and which meshes with the sprocket gear 218. An idler gear 402 takes up any slack in the sprocket chain 400, and a sprocket gear 404 is mounted on the shaft 56 and meshes with that sprocket chain. A sprocket gear 405 also is mounted on the shaft 56; and it is driven by a sprocket chain 425 which, in turn, is driven by a sprocket gear 423 on the output shaft of the gear box 238. The numeral 437 denotes a sprocket gear which is mounted on the shaft 216, and hence is driven by the sprocket gear 218. A sprocket chain 442 meshes with the sprocket gear 437 and also meshes with, and drives, a sprocket gear 440, as shown particularly by FIG. 5.

The numeral 406 in FIGS. 2 and 7 denotes a plate which is welded to the inner surface of the front and of the left-hand side of the enclosure 44 a short distance below the level of the horizontally-directed portion 34 of the wide plate. A pin 408 connects an air cylinder 410 to that plate; and the piston 412 of that cylinder is connected to the laterally-movable frame by a pin 414. A relatively-small air pressure—in the range of fifteen to twenty pounds per square inch—is applied to that cylinder by a hose 415. That air pressure tends to move the piston 412 toward its retracted position, and hence tends to move the laterally-movable frame to the left in FIG. 7; but that air pressure can be overcome to permit that frame to be moved to the right.

An air cylinder 420, which is adjacent the right-hand side of FIG. 7, has the forward end thereof secured to a downwardly-directed projection 419 on the laterally-movable frame by a pin 418; and the piston 422 of that air cylinder is connected to the forward-rearward frame by a pin 424. A small air pressure—in the range of fifteen to twenty pounds per square inch—is supplied to the cylinder 420 by a hose, not shown. That air pressure will tend to move the piston 422 to its retracted position, and hence will tend to move the forward-rearward frame in the forward direction relative to the laterally-movable frame. However, that air pressure can be overcome to permit movement of the forward-rearward frame rearwardly relative to the laterally-movable frame.

The numeral 430 denotes a pin which secures one end of an air cylinder 432 to the downwardly-depending extension of strut 191, as shown by FIG. 6. The piston 434 of that cylinder is connected to the lower plate 195 of the mount 205 by a pin 436. A small air pressure—in the range of fifteen to twenty pounds per square inch—is supplied to the cylinder 432 by an air hose 433. That air pressure will urge the piston 434 to its extended position, and hence will tend to rotate the mount 205 and the lower portion 92 of the torch arm in the counterclockwise direction in FIG. 7. However, that air pressure can be overcome to permit that mount and that torch arm to be rotated in the clockwise direction.

The numeral 448 in FIG. 4 denotes a plate which is secured to the upper surface of the enclosure 44; and end plates 450 and 452 and an intermediate plate 454 are secured to, and extend upwardly from, the plate 448. Anti-friction bearings 456 and 458 are disposed within sockets in the intermediate plate 454 and end plate 452, respectively; and the inner races of those bearings support a shaft 460. A pointer 462 is secured to the upper end of intermediate plate 454; and it extends to the left from that plate. The sprocket gear 440 has a pin 443, a centering projection 445 which extends to the left, and a dial 444 which extends to the right. That dial has three hundred and sixty lines thereon to represent the number of degrees in a cylinder; and the pointer 462 will indicate the particular orientation of pin 443 relative to the geometric center of shaft 460.

The numeral 439 denotes a socket in the right-hand end of a shaft 438; and that socket telescopes over the centering projection 445 on the sprocket gear 440. A block 441 has an opening in the upper end thereof which telescopes over the pin 443 on the sprocket gear 440; and a machine screw 446 can clamp that block tightly to the shaft 438. In doing so, that block forces the sprocket gear 440 to rotate that block, and hence the shaft 438.

A notch 451 extends upwardly to the upper surface of the end plate 450, and that notch is wide enough to accommodate the shaft 438. A generally-circular recess 455 extends inwardly from the left-hand face of end plate 450 to merge with slot 451 and to accommodate the outer race of an anti-friction bearing 453, all as shown by FIG. 4. The inner race of that bearing accommodates a reduced-diameter left-hand end of the shaft 438. A retaining plate 478 is releasably held at the left-hand face of the end plate 450 by pins 480 and a knurled knob 482. Removal of that plate permits anti-friction bearing 453 and the left-hand end of shaft 438 to be shifted upwardly and to the left to separate the socket 439 in the right-hand end of that shaft from the centering projection 445 on the sprocket gear 440. Numerals 470, 472, 474 and 476 denote disc-like cams with hubs that are releasably secured to the shaft 438.

The numeral 506 in FIG. 2 denotes a bracket which is secured to the upper portion of the enclosure 44; and that bracket supports an elongated, horizontally-directed pivot 508. The numeral 510 generally denotes a cam follower which includes a bar 512 with a hub that telescopes over pivot 508, two bar-like arms 514 and 516 that are welded to the forward end of the bar 512, and a pivot 520 that rotatably holds a roller 518 in position to rest upon the cam 470. The numeral 526 denotes a rod with a threaded upper end that extends between the bar-like arms 514 and 516, through a concavo-convex washer 522 and a bearing member 524 to be held by a nut 528, as shown particularly by FIG. 3. The threaded lower end of that rod seats in a threaded socket in the upper end of an elongated rod 530 which, together with the rod 526 and an eye-bolt, constitute an adjustable-length link. The pin 532 connects that link to the horizontally-directed arm of lever 388.

The numeral 534 generally denotes a cam follower which is mounted on the pivot 508 and which holds a roller 535 in position to rest upon the cam 472. A rod 536, an elongated rod 538 and an eye-bolt constitute an adjustable-length link which coacts with the pin 354 to connect the cam follower 534 to the horizontally-directed arm of lever 350. That rod, that elongated rod, and that eye-bolt constitute an adjustable-length link. The numeral 540 denotes a further cam follower which is mounted on the pivot 508, and it holds a roller 541 in position to rest upon the cam 474. A rod 542, an elongated rod 544 and an eye-bolt constitute an adjustable-length link which coacts with the pin 546 to connect the cam follower 540 to the horizontally-directed arm of lever 370. The numeral 548 generally denotes a further cam follower which is mounted on the pivot 508, and it holds a roller 549 in register with the cam 476. A rod 550, an elongated rod 552 and an eye-bolt constitute an adjustable-length link which coacts with the pin 554 to connect cam follower 548 to the horizontally-directed arm of lever 338.

Referring particularly to FIGS. 2 and 6, the numeral 556 denotes a U-shaped bracket which is secured to the top of the enclosure 44 intermediate the bracket 506 and the plate 448. A cylindrical cam 560 is mounted on a pivot 558 that is journaled in the arms of bracket 556. A handle 562 is clamped to the pivot 558 to enable the cam to be rotated from the normal solid-line position of FIG. 2 to the dotted-line upper position.

Whenever the cam 560 and the handle 562 are in the lower solid-line positions of FIG. 2, the rollers 518, 535, 541 and 549 are able to rest upon and follow the "rises" and "falls" of the cams 470, 472, 474 and 476, respectively. The cam 470 will act through cam follower 510, rods 526 and 530, bell crank lever 388, and adjustable-length link 394 to control the pivoting of the mount 205 about the axis of cylindrical rod 189; and the "rises" on that cam will overcome the air pressure in the air cylinder 432. However, that air pressure will hold the roller 518 in engagement with the "rises", "dwells" and "falls" on that cam; and those "rises", "dwells" and "falls" will be dimensioned to provide the required rotation of the welding torch 104 relative to any joints on the workpiece 496 that are to be welded. Specifically, "rises" on cam 470 will rotate lever 388 in the counterclockwise direction in FIG. 6 and thereby rotate the mount 205 and the torch arm in the clockwise direction in FIG. 7. The "falls" on that cam will permit the air pressure in cylinder 432 to rotate that mount and torch arm in the opposite direction.

The cam 472 will act through cam follower 534, rods 536 and 538, bell crank lever 350, adjustable length link 356, bell crank lever 360 and adjustable length link 366 to provide the desired vertical movement of the up-down frame. Specifically, "rises" on the cam 472 will rotate the lever 350 in the clockwise direction in FIG. 6, and thereby will rotate the lever 360 in the counterclockwise direction in FIG. 6 to cause the adjustable-length link 366 to raise the up-down frame relative to the guide rods 169 and 171. However, "falls" on that cam will permit the force of gravity to rotate the lever 360 in the clockwise direction in FIG. 6, with consequent downward movement of the up-down frame, and with consequent rotation of lever 350 in the counterclockwise direction. Where a workpiece is to have a three hundred and sixty degree weld formed around a tubular portion thereof—such as the tubular piece 502 of FIG. 1—the welding torch 104 can be moved vertically while being moved forwardly and rearwardly to co-act with the less-than-three hundred and sixty degree rotation of that workpiece to provide a continuous three hundred and sixty degree weld on that portion.

The cam 474 will act through cam follower 540, rods 542 and 544, bell crank lever 370, adjustable length link 376, and bell crank lever 380 to provide forward-rearward movement of the forward-backward frame relative to the laterally-movable frame. Specifically, "rises" on cam 474 will rotate the lever 370 in the counterclockwise direction in FIG. 6 and thereby will rotate the lever 380 in the clockwise direction in FIG. 7. Because the pin 382 is held against appreciable forward-rearward movement relevant to the laterally-movable frame the adjustable-length link 384, the clockwise rotation of lever 380 will shift the forward-backward frame rearwardly relative to the laterally-movable frame. The air pressure in the air cylinder 420 will not prevent such movement; but that air pressure will hold the roller 541 in intimate engagement with the periphery of cam 474 at all times. During any "falls" on cam 474, that air pressure will cause the forward-rearward frame to move forwardly relative to the laterally-movable frame; and also will cause the lever 380 to rotate in the counterclockwise direction. The consequent rotation of the lever 370 in the clockwise direction will be limited by the engagement of the roller 541 with the periphery of cam 474.

The cam 476 will act through cam follower 548, rods 550 and 552, bell crank lever 338, adjustable length link 344, brackets 318 and 328, and bars 310 and 312 to control the position of the laterally-movable frame relative to the guide rods 121 and 123. Specifically, "rises" on that cam will cause the lever 338 to rotate in the clockwise direction, and, because the pin 346 and the adjustable-length link 344 prevent substantially all horizontal movement of the pin 342, that rotation of that lever will force the pivot 340 to shift to the right in FIG. 6. The resulting shifting of brackets 318 and 328 and of bars 310 and 312 to the right will shift the laterally-movable frame to the right. The air pressure in the cylinder 410 will not prevent such shifting; but it will hold the roller 549 in engagement with the cam 476 during the "rises", "dwells" and "falls" on that cam. As a "fall" moves into register with the roller 549, the piston 412 will move toward its retracted position; and the resulting shifting of bars 310 and 312 and of brackets 318 and 328 to the left in FIGS. 6 and 7 will rotate the lever 338 in the counterclockwise direction until the roller 549 halts further counterclockwise rotation of that lever.

It will be noted that the bell crank levers 388, 370 and 350, which, respectively, control the rotation of the mount 205, the forward-rearward movement of that mount, and the up-down movement of that mount move laterally as the laterally-movable frame moves. This is very desirable; because it eliminates all need of modifying the "rises", "dwells" and "falls" of cams 470, 472, and 474 to compensate for the lateral movement of the laterally-movable frame. As a result, the amount of angular movement of the mount 205 can be directly measured and incorporated into the design of the cam 470, the amount of forward-rearward movement for that mount can be directly measured and incorporated into the cam 472, and the amount of up-down movement for that mount can be measured and directly incorporated into the cam 474. Further, because the lateral movement, the forward-rearward movement and the up-down movement of the mount 205 are along three orthogonally-oriented axes, the movements along those axes can be directly measured and do not have to be modified—as in my said application where the forward-rearward movement is along an arc. Further, the up-down movement of the mount 205 is vertical and hence no compensation need be provided for non-linear movement as sometimes must be done in my said application. The overall result is that the welding machine provided by the present invention can have the values of the "rises", "dwells", and "falls" of the cams 470, 472, 474 and 476 easily measured.

Further it will be noted that cam 470, cam follower 510, rods 526 and 530, bell crank lever 388 and adjustable-length link 394 can effect any desired setting or rotation of the mount 205, and of the welding torch 104, about the axis defined by the cylindrical rod 189 regardless of the vertical position, the forward-rearward position, or the side-to-side position of that cylindrical rod. Similarly, cam 472, cam follower 534, rods 536 and 538, bell crank lever 350, adjustable-length link 356, bell crank lever 360, and adjustable-length link 366 can effect any desired up-down setting or movement of the mount 205, and of the welding torch 104, regardless of the angular position of that mount and torch and also regardless of the forward-rearward position or side-to-side position of the up-down frame. Additionally, cam 474, cam follower 540, rods 542 and 544, bell crank lever 370, adjustable-length link 376 and bell crank lever 380 can effect any desired forward-rearward setting or movement of the mount 205, and of welding torch 104, regardless of the angular position of that mount and torch and also regardless of the vertical position or side-to-side position of the up-down frame. Moreover, cam 476, cam follower 548, rods 550 and 552, elongated brackets 318 and 328, and bars 310 and 312 can effect any desired side-to-side setting or movement of the mount 205, and of torch 104, regardless of the angle at which that mount and torch are set and also regardless of the vertical position or forward-rearward position of the up-down frame. It will also be noted that any two, three or four of the cams 470, 472, 474 and 476 can simultaneously coact with the linkages which they control to provide simultaneous rotation or movement of the mount 205, and of welding torch 104. In this way, precise control can be provided by the cams, either individually or simultaneously, to effect any desired setting or movement of the welding torch 104 relative to a workpiece.

By setting the forward-rearward frame in a position wherein the vertical axis of the cylindrical rod 189 is tangential to the periphery of the tubular piece 502, it is possible to rotate the mount 205 and the welding torch 104 through any desired angle while maintaining the tip of that torch at a fixed point along the length of the tubular piece 502. As a result, the welding machine of the present invention can provide rotation of the mount 205, and of the torch 104, about a fixed point on a tubular workpiece by "dwells" on cams 472, 474, and 476 and by "rises" and "falls" on cam 470.

It will be noted that the cams 470, 472, 474 and 476 can easily be shifted circumferentially relative to each other and relative to the dial 444 by loosening set screws, not shown, which normally lock those cams against rotation relative to the shaft 438. Thereafter, it is a simple matter to set the dial 444 so a desired angle thereon is in register with the pointer 462, and to align appropriate points on the peripheries of the cams 470, 472, 474 and 476 with that pointer. Further, it will be noted that it is easy to remove the cams 470, 472, 474 and 476 and to replace them with cams which are intended to control the movement of the welding torch 104 during the welding of different workpieces. All that need be done is rotate the handle 562 from the solid-line position to the dotted-line position of FIG. 2—to raise the rollers 518, 535, 541 and 549 out of engagement with the cams 470, 472, 474 and 476, loosen the knurled knob 482 and separate the retaining plate 478 from the end plate 450, shift the reduced-diameter left-hand end of shaft 438 and the anti-friction bearing 453 thereon to the left until that bearing is out of the recess 455, and then raise that shaft upwardly out of the notch 451. The socket 439 in the right-end of that shaft will easily move away from the centering pin 445 on the sprocket wheel 440; and then a replacement shaft with replacement cams can be set in the position previously occupied by shaft 438 and cams 470, 472, 474 and 476. The subsequent return of the handle 562 from its dotted-line position to its solid-line position in FIG. 2 will place the welding machine in position to perform a desired welding operation on a specifically-different workpiece. The removal and replacement of the shaft 438 can be accomplished without any need of using tools.

When the welding machine of the present invention is manufactured in large quantities, the costs of one-piece links will become less than the cost of the adjustable-length links 344, 356, 376 and 394 and of the adjustable-length links which, respectively, include rods 526 and 530 and an eye-bolt, rods 536 and 538 and an eye-bolt, rods 542 and 544 and an eye-bolt, and rods 550 and 552 and an eye-bolt. At such time, those one-piece links will be substituted for the eight adjustable-length links; but, until such time, the disclosed adjustable-length links are less expensive and hence are preferred. Any adjustments, which might be needed in the initial positions of the up-down frame, of the forward-rearward frame, of the laterally-movable frame or of the torch arm relative to each other, can be made by loosening or tightening the nuts on the upper ends of the rods 526, 536, 542 and 550. The bell crank levers 388, 350, 370 and 338, respectively, will convert any resulting relative vertical movement into corresponding relative horizontal movement.

In making a set of cams for a given workpiece, the forward-rearward frame will be shifted rearwardly along the guide rods 149 and 151 of the laterally-movable frame until the welding torch 104 is spaced an appreciable distance rearwardly of the welding fixture—which can be the welding fixture 490 or any suitable welding fixture. The workpiece will then be secured to the welding fixture, and that welding fixture will be rotated to a position which is half-way between the starting and ending points of the path through which that welding fixture will be rotated as the workpiece is being welded. The pointer 462 and the dial 444 of FIG. 4 can be used to make sure that the welding fixture is set in the desired half-way position. The welding fixture preferably is rotated to the half-way position by hand, as by disengaging sprocket chain 400 or 425; but that welding fixture could be rotated to that position by repeatedly energizing and de-energizing motor 236 to "inch" that welding fixture into that position. The positions of the elongated brackets 318 and 328 relative to the elongated bars 310 and 312 will then be checked—and if necessary changed—to dispose the laterally-movable frame approximately midway of the path of lateral movement through which it will have to move as the workpiece is being welded. Adjustment of the positions of the elongated brackets 318 and 328 relative to the elongated bars 310 and 312 can provide a lateral shifting of as much as six inches in the position of the laterally-movable frame relative to the workpiece; and, if a larger shift is required, longer bars 310 and 312 will be used. Each time the positions of the elongated brackets 318 and 322 are shifted relative to the elongated bar 111—whether by being shifted relative to the elongated bars 310 and 312 or by being secured to longer bars 310 and 312—the links 344, 356, 376 and 394 must be replaced. The elongated—or even longer—bars 310 and 312 and the elongated brackets 318 and 328 will then be shifted laterally to shift the laterally-movable frame along the guide rods 121 and 123 until the tip of the welding torch 104 is midway of the path of lateral movement through which it will have to move as the workpiece is being welded. The up-down frame will be shifted along the lengths of the guide rods 169 and 171 of the forward-rearward frame until the tip of the torch 104 is midway of the path of up-down movement through which it will have to move as the workpiece is being welded. Similarly, the non-linear torch arm will be rotated to a position where it disposes the tip of the torch 104 midway of the path of rotation through which it will have to move as the workpiece is being welded.

Once the laterally-movable frame, the up-down frame, and the torch arm have been set to dispose the tip of the torch 104 midway of its lateral, vertical and rotative paths of movement, the forward-rearward frame will be moved forwardly along the guide rods 149 and 151 of the laterally-movable frame to dispose the tip of the torch 104 a desired distance from the confronting portion of the workpiece. If necessary, fine adjustments can then be made in the positions of the laterally-movable frame, of the up-down frame, and of the torch arm to provide the exact position of the tip of torch 104 relative to the confronting portion of the workpiece. At such time, the vertical distance between the plate 448 in FIG. 4 and each of the rollers 518, 535, 541 and 549 will be measured and recorded. Thereafter, the welding fixture will be successively shifted through fixed angles indicated by pointer 462 and dial 444—usually ten degrees—toward one end of the rotative path through which it must be moved as the workpiece is being welded; and, at the end of each of those shifts, the position of the tip of torch 104 relative to the confronting portion of the workpiece will be checked. If necessary, the positions of the laterally-movable frame, the up-down frame, of the torch arm, and of the forward-rearward frame will be adjusted to provide the desired relative spacing between, and attitudes of, the tip of torch 104 and the confronting portion of the workpiece. At the end of each of those shifts, whether or not any adjustment was required, the vertical distance between the plate 448 and each of the rollers 518, 535, 541 and 549 will be measured and recorded. Subsequently, the welding fixture will be returned to its midway position, and then will be successively shifted through fixed angles towards the other end of its rotative path—with measurements of the positions of the rollers 518, 535, 541 and 549 being made at the end of each of those shifts.

It it is assumed that the workpiece will be rotated through an angle of three hundred degrees (300°), but that a continuous weld of three hundred and sixty degrees is desired, the up-down frame should be shifted, at the end of each fixed angle, a distance which will make the total vertical movement of the tip of the torch 104 include a movement which simulates sixty degrees (60°) of rotation of the workpiece. For example, if the workpiece includes a tubular section that is held coaxial with the shafts 216 and 254 of FIG. 1, if that tubular section has an outer diameter of one inch, and if each shift of the welding fixture is ten degrees, the up-down frame should be shifted one thirtieth (1/30) of seven hundred and seven thousandths (0.707) of an inch, or twenty-three thousandths (0.023) of an inch, at the end of each ten degree shift.

During a welding operation, the workpiece will become progressively heated; and, where that workpiece is made of relatively thin metal, it is desirable to progressively move the tip of the torch 104 away from the confronting portion of the workpiece to make it possible to form a smooth, uniform and strong weld. That movement will be in the plane defined by the torch arm; and hence it can have both lateral and forward-rearward components of movement. If it is assumed that the initial spacing of the tip of torch 104 from the confronting portion of the workpiece should be four hundred thousandths (0.400) of an inch and that the final spacing of that tip from that confronting portion should be seven hundred thousandths (0.700) of an inch, and if it is assumed that the welding fixture is rotated a total of three hundred degrees (300°), the forward-rearward frame should be moved rearwardly an extra one thousandth (0.001) of an inch for each one degree of rotation of that welding fixture.

The initial four hundred thousandths (0.400) of an inch rearward displacement of the forward-rearward frame and the one thousandth (0.001) of an inch displacement of that frame for each one degree of rotation of that welding fixture can be added to the distances that were measured for the roller 541; and the resulting values will be used to plot precisely fixed points for the profile of cam 474. A french curve will then be used to provide smooth "rises" and "falls" between those precisely-fixed points. Similarly, the extra displacement for the up-down frame can be added to the distances that were measured for the roller 535; and the resulting values will be used to plot precisely fixed points for the profile of cam 472. A french curve will then be used to provide smooth "rises" and "falls" between those precisely fixed points. The measured distances for the rollers 518 and 549 also will be used to plot precisely fixed points for the profiles of cams 470 and 476. A french curve will then be used to provide smooth "rises" and "falls" between those precisely fixed points.

The measuring of the positions of the rollers 518, 535, 541 and 549 can be accomplished quickly and easily because they are readily accessible. Also, that measuring can be accomplished quickly and easily because those rollers are close enough to the welding fixture to enable the person, who is making the measurements, to reach over and rotate that welding fixture while he is watching the dial 444 and pointer 462. In addition, that measuring can be accomplished quickly and easily because those rollers are mounted adjacent the dial 444; and hence the angular position, at which each set of measurements is taken, is plainly apparent to the person taking those measurements. The effective utilization of any set of cams is assured by mounting those cams on the same shaft and by mounting an indicator, such as dial 444, on that same shaft.

The profiles of the cams 472, 474 and 476 could, if desired, be calculated. The calculation would be relatively easy—even with workpieces of unusual configurations—because each of the cams 472, 474 and 476 substantially controls movement along only one axis, and because cam 470 substantially controls only rotation of the torch arm. However, it is preferred to establish the profiles of all the cams by rotating the welding fixture in step-by-step fashion, by making any adjustments that are needed in the positions of the three frames and of the torch arm at the end of each step, by measuring the positions of the rollers 518, 535, 541 and 549 at the end of each step, and by then using those measurements to plot the cam profiles.

The cams 472, 475 and 476 can provide a two (2) inch range of movement for the up-down frame, the forward-rearward frame, and the laterally-movable frame. The cam 470 can provide a rotation for the torch arm of forty-five degrees (45°) in either direction from a middle position wherein that torch arm is parallel to the confronting wall of enclosure 44. A larger welding machine could, of course, be made to provide even larger ranges of movement for the up-down frame, the forward-rearward frame, and the laterally-movable frame.

The welding machine provided by the present invention is particularly useful in forming continuous uninterrupted welds that have angular extents greater than the angles through which the workpieces are rotated; and the motor can be set to oscillate between any two desired angular positions by limit switches and a motor reversing circuit of standard and usual design. Those limit switches can be spaced apart by any desired angle which is less than three hundred and sixty degrees; and they will coact to limit any uni-directional rotation of the welding fixture 490 to that angle. However, if desired, the welding machine of the present invention could be used to form welds on workpieces that are rotated through three hundred and sixty degrees.

The present invention minimizes the space which is required for the cams 470, 472, 474 and 476 by mounting all of those cams on the same shaft. Further, the present invention minimizes the space which is required for the linkages that transmit motion from those cams to the mount 205 and to the three frames which directly and indirectly support that mount, as by utilizing the bell crank levers 338, 370, 350 and 388 which are located between, and which are rotatable relative to, the elongated brackets 318 and 328. As a result, the present invention provides a welding machine which can provide precisely-controlled vertical, lateral, forward-rearward, and rotational movement of a welding torch while occupying only a minimum amount of space.

The present invention also simplifies the making of the profiles of the cams 470, 472, 474 and 476 by causing the shaft 438 to rotate in the same direction, and to the same angular extent, as the welding fixture 490. With such relative movement of that shaft and of that fixture, there is a direct angular relationship between any given point on the workpiece held by that fixture and a corresponding point on each of the cams 470, 474 and 476.

The welding machine provided by the present invention has a second set, not shown, of guide rods 121 and 123, a second laterally-movable frame supported by those guide rods, a second forward-rearward frame supported by guide rods 149 and 151 of that second laterally-movable frame, a second up-down frame supported by the guide rods 169 and 171 of that second forward-rearward frame, a second mount 205, a second torch arm, and a second welding torch 104. Also, a supporting structure 570 is provided on top of the enclosure 48 to hold a second shaft 438 and a second set of cams 470, 472, 474 and 476. Further, a second bracket 506 will be provided atop the enclosure 48 to rotatably support a second set of cam followers 510, 534, 540 and 548. Moreover, a second set of adjustable-length links and bell crank levers, which are identical to the adjustable-length links and the bell crank levers associated with the first set of cams 470, 472, 474 and 476 will be associated with the second set of cams 470, 472, 474 and 476 to provide movement of the second mount 205, of the second up-down frame, of the second forward-rearward frame, and of the second laterally-movable frame. Because the second set of components will merely duplicate the first set of components, they have not been shown in the drawing.

Referring particularly to FIG. 13, the numeral 580 generally denotes a stirrup which has a tubular portion 582 with ends that are cut at angles to the axis of that portion. The generally U-shaped portion of the stirrup 580 has upper portions 584 which incline inwardly toward, and which are welded to, the elliptical ends of the tubular portion 582.

FIGS. 14A and B show the position in which the stirrup 580 will be disposed at the beginning of the two hundred and seventy degrees of rotation of that stirrup during which continuous uninterrupted three hundred and sixty degree welds will be formed between the opposite ends of the tubular portion 582 and the inclined portions 584. The welding torch 104 will form one of those welds, and a similar torch, not shown, which will be controlled by a set of cams held by the supporting structure 570, will form the other of those welds. In the position of FIGS. 14A and B, the tip of the torch 104 will start forming the weld at a point which is displaced to the right, in the right-left direction, from an X reference line, as indicated by the notation X (+) in FIG. 14A, is displaced rearwardly, in the forward-rearward direction, from a Y reference line as indicated by arrows and the notation Y (+) in FIG. 14B, and is displaced upwardly in the up-down direction, from a Z reference line, as indicated by the arrows and the Z (+) in FIG. 14B, and the welding torch is displaced in the counter-clockwise direction from a $\theta$ reference angle, as indicated by an arrow and the notation $\theta$ (+) in FIG. 14A. Similar X (+) notations are shown in FIGS. 15A, 16A, and 18A–20A, similar Y (+) notations are shown in FIGS. 15B–20B, similar Z (+) notations are shown in FIGS. 15B and 16B, and a similar $\theta$ (+) notation is shown in FIG. 20A. However, no X or Z notation is shown in FIG. 17A because the tip of welding torch 104 is at the X and Z reference lines. Z (−) notations are shown in FIGS. 18B–20B and $\theta$ (−) notations are shown in FIGS. 15A–19A. The angular displacement of stirrup 580 from the initial position of FIG. 14B is shown by the smaller-diameter angle-indicating arrow in FIGS. 15B–20B; and the length of the weld is shown by the larger-diameter angle-indicating arrow in those views. The following chart shows how the values of the displacements along the three orthogonally-displaced axes and the angular displacement change as the stirrup and the welding torch are removed relative to each other during the forming of the three hundred and sixty degree weld:

|  | 14A, 14B | 15A, 15B | 16A, 16B | 17A, 17B | 18A, 18B | 19A, 19B | 20A, 20B |
|---|---|---|---|---|---|---|---|
| ROTATION OF STIRRUP | 0 | 45° | 90 | 135 | 180 | 225° | 270° |
| ANGULAR EXTENT OF WELD | 0 | 60° | 120 | 180 | 240° | 300° | 360° |
| X | +.210 | +.140 | +.070 | .000 | +.070 | +.140 | +.210 |
| Y | +.353 | +.433 | +.483 | +.500 | +.483 | +.433 | +.353 |
| Z | +.353 | +.250 | +.129 | .000 | −.129 | −.250 | −.353 |
| $\theta$ | +34° | −30° | −30° | −30° | −30° | −30° | +34° |

An examination of that chart shows the displacement along the X-axis ranges from 0.210 to 0, that the displacement along the Y-axis ranges from 0.353 to 0.500, that the displacement along the Z-axis ranges from +0.353 to −0.353, and that the angular deflection of the welding torch ranges from +34° to −30°. Further, that examination shows that each of the displacements along the X-axis, the Y-axis and the Z-axis changes from position to position as the stirrup 580 is rotated from the position of FIGS. 14A and 14B to the position of FIGS. 20A and 20B. Moreover, if the chart were made detailed enough so each angle of rotation of that stirrup was recorded, it would be noted that the positions of the part and torch have to be changed continuously during the forming of the weld. It should also be noted that the torch angle changed from a plus thirty-four degrees (34°) to a minus thirty degrees (−30) while the Y dimension was increasing from 0.353 to 0.433. Also, it will be noted that the torch angles changed from a minus thirty degrees (−30°) to a plus thirty-four degrees (+34°) while the Y dimension was decreasing from 0.433 to 0.353. This means that the cam 470 and the cam 474 can provide oppositely-directed movements, and hence can provide movements which the single (rotation and forward-rearward) cam in the welding machine of my said application could not provide.

The stirrup 580 is made of heavy gauge metal such as 11 gauge metal. Consequently, there is no need to progressively increase the initial distance between the tip of torch 104 and the confronting surface of the workpiece to compensate for the progressive heating of that workpiece. However, if the workpiece has been made of light gauge metal, such as 16 gauge metal—and particularly 18 gauge metal—each of the X and Y dimensions in FIGS. 15A and B through 20A and B would have been progressively augmented to reflect a progressive increase in the spacing between the tip of torch 104 and the confronting surface of the workpiece.

Whereas the drawing and accompanying description have shown and described the preferred embodiment of the present invention, it should be apparent to those skilled in the art that various changes may be made in the form of the invention without affecting the scope thereof.

What I claim is:

1. A welding machine which comprises a first frame that is movable along a generally-horizontal axis to provide lateral movement, a first cam and a first cam-responsive linkage that can selectively move said first frame, a second frame that is movable along a second generally-horizontal axis to provide forward-rearward movement, a second cam and a second cam-responsive linkage that can selectively move said second frame, a third frame that is movable along a generally-vertical axis to provide up-down movement, a third cam and a third cam-responsive linkage that can selectively move said third frame, a pivot that receives direct support from one of said three frames and indirect support from the other two of said three frames, a mount for a welding torch that is rotatable about said pivot, a fourth cam and a fourth cam-responsive linkage that can selectively rotate said mount about said pivot, said one frame receiving direct support from an intermediate one of said three frames and indirect support from the last of said three frames and said intermediate frame receiving direct support from said last frame, whereby said mount for said welding torch can be moved from side to side along a generally-horizontal axis, can be moved forwardly and rearwardly along a second generally-horizontal axis, can be rotated about a generally-vertical axis, and can be moved up and down along said generally-vertical axis to provide movement of said mount for said welding torch along and relative to three axes, each of said four cam-responsive linkages having a plurality of members and each of said members being resistant to bending and remaining substantially free of bending throughout the operation of said welding machine, a first member of the plurality of members of each of said four cam-responsive linkages being rotatable about an axis of rotation and receiving a driving force which is eccentric of said axis of rotation and which is applied by a second member of said plurality of members that moves along a generally-linear predetermined path and that is pivotally secured to said first member, said first member responding to said received driving force from said second member to provide a driving force which is eccentric of said axis of rotation and which is applied to a third member of said plurality of members that moves along a generally-linear second predetermined path which is angularly displaced from the first said generally-linear predetermined path and that also is pivotally secured to said first member, means to drive said first, second, third and fourth cams so all of said cams move simultaneously and at the same rate, a movable work-holding fixture which is adapted to hold and to move a workpiece relative to said welding torch, and mechanical means that physically synchronize the movement of said movable work-holding fixture with the movement of said cams.

2. A welding machine as claimed in claim 1 wherein stationary guide rods slidably support said last frame, wherein said last frame is an open-type frame, wherein said last frame has guide rods that slidably support said intermediate frame, wherein said intermediate frame is an open-type frame that has guide rods which slidably support said one frame, wherein all movement of said intermediate frame is within limits defined by said last frame, and wherein said third members of said cam-responsive linkages extend generally parallel to each other and extend from said first members of said cam-responsive linkages toward said frames.

3. A welding machine which comprises a mount for a welding torch, a first cam, a first cam-responsive means intermediate said first cam and said welding torch which can effect rotation of said welding torch about an axis, a second cam, a second cam-responsive means intermediate said second cam and said axis which can effect vertical movement of said welding torch while permitting rotation of said welding torch about said axis, a third cam, a third cam-responsive means intermediate said third cam and said axis which can effect forward-rearward movement of said axis and hence of said welding torch while permitting rotation of said welding torch about said axis, a fourth cam, a fourth cam-responsive means intermediate said fourth cam and said axis which can effect lateral movement of said axis and hence of said welding torch while permitting rotation of said mount about said axis, each of said four cam-responsive means having a plurality of members, each of said members being resistant to bending and remaining substantially free of bending throughout the operation of said welding machine, a first member of the plurality of members of each of said four cam-responsive means being rotatable about an axis of rotation and receiving a driving force from a second member of said plurality of members that is pivotally secured to said first member, said first member responding to said received driving force from said second member to apply a driving force to a third member of said plurality of members which is pivotally secured to said first member, a movable work-holding fixture which is adapted to hold and move a workpiece relative to said welding torch, and mechanical means that physically synchronize the movement of said movable work-holding fixture with movement of said cams.

4. A welding machine as claimed in claim 3 wherein each of said cam-responsive means has a length-adjusting portion which is spaced away from the cam therefor and which is remote from said welding torch, and wherein said length-adjusting portions are close enough to each other so a person can adjust the lengths of all of said cam-responsive means while remaining in a fixed position.

5. A welding machine as claimed in claim 3 wherein all of said cams are mounted on a common shaft, wherein a driving shaft selectively drives said common shaft, wherein said common shaft and said cams can be bodily and radially removed from, and bodily and radially replaced adjacent, said driving shaft to enable said driving shaft to drive said common shaft, and supporting means which provide support for both ends of said common shaft.

6. A welding machine as claimed in claim 3 wherein a common shaft supports and rotates all of said cams, wherein a dial with orienting indicia thereon normally is rotatable with said common shaft and hence with said cams, wherein one or more of said cams can be adjusted circumferentially relative to said common shaft and hence relative to said dial to effect a desired orientation of said cams relative to said dial, and hence relative to said common shaft, and wherein said dial is closely adjacent said cams and is accessible to an operator in a position adjacent said cams.

7. A welding machine as claimed in claim 3 wherein a first frame is movable laterally to effect said lateral movement of said axis, wherein a second frame is movable forwardly and rearwardly to effect said forward-rearward movement of said axis, wherein a third frame is movable vertically to effect said vertical movement of said welding torch, wherein at least a portion of all of said cam-responsive means is bodily movable with one of said frames, wherein said one frame is said laterally-movable frame, wherein said portion of each of said cam-responsive means is a bell crank lever, and wherein each of said cam-responsive means has an elongated member which extends from the cam for said cam-responsive means to the bell crank lever of said cam-responsive means.

8. A machine wherein a member can be moved relative to a second member, and which comprises a mount for one of said members, a first cam, a first cam-responsive means intermediate said first cam and said mount which can effect rotation of said mount, and hence of said one member, about an axis, a second cam, a second cam-responsive means intermediate said second cam and said mount which can effect movement of said mount, and hence of said one member, parallel to said axis, a third cam, a third cam-responsive means intermediate said third cam and said mount which can effect movement of said mount, and hence of said one member, transversely of said axis in a given direction, a fourth cam, and a fourth cam-responsive means intermediate said fourth cam and said mount which can effect movement of said mount, and hence of said one member, transversely of said axis in a direction which is displaced from the first said transverse direction, said cams being bodily movable away from the corresponding cam-responsive means therefor to permit movement of each of said corresponding cam-responsive means in response to movement of said mount, and hence of said one member, relative to the other of said members, said one member being movable in step-by-step fashion to enforce movement of one or more of said cam-responsive means to facilitate the determination of the "rises", "falls" and "dwells" of said cams corresponding to said cam-responsive means, all of said cam-responsive means for all of said four cams being accessible to an operator while said operator remains in a fixed location so the "rises", "falls" and "dwells" for each of said four cams can be determined during step-by-step positioning of said one member while said operator remains in said fixed location.

9. A machine wherein a member can be moved relative to a second member, and which comprises a mount for one of said members, a first cam, a first cam-responsive means intermediate said first cam and said mount which can effect a desired movement of said mount, and hence of said one member, relative to the other of said members, a second cam, a second cam-responsive means intermediate said second cam and said mount which can effect a different desired movement of said mount, and hence of said one member, relative to said other member, a third cam, a third cam-responsive means intermediate said third cam and said mount which can effect a further desired movement of said mount, and hence of said one member, relative to said other member, each of said cam-responsive linkages having a plurality of members, and each of said members being resistant to bending and remaining substantially free of bending throughout the operation of said machine, a first member of the plurality of members of each of said cam-responsive linkages being rotatable about an axis of rotation and receiving a driving force which is eccentric of said axis of rotation and which is applied by a second member of said plurality of members that moves along a generally-linear predetermined path and that is pivotally secured to said first member, said first member responding to said received driving force from said second member to provide a driving force which is eccentric of said axis of rotation and which is applied to a third member of said plurality of members that moves along a generally-linear second predetermined path which is angularly displaced from the first said generally-linear predetermined path and that also is pivotally secured to said first member, means to drive said first, second and third cams so all of said cams move simultaneously and at the same rate, a movable work-holding fixture which is adapted to hold and to move a workpiece, and mechanical means that physically synchronize the movement of said movable work-holding fixture with the movement of said cams.

10. A machine wherein a member can be moved relative to a second member, and which comprises a mount for one of said members, a first cam, a first cam-responsive means intermediate said first cam and said mount which can effect a desired movement of said mount, and hence of said one member, relative to the other of said members, a second cam, a second cam-responsive means intermediate said second cam and said mount which can effect a different desired movement of said mount, and hence of said one member, relative to said other member, a third cam, a third cam-responsive means intermediate said third cam and said mount which can effect a further desired movement of said mount, and hence of said one member, relative to said other member, each of said cam-responsive linkages having a plurality of members, and each of said members being resistant to bending and remaining substantially free of bending throughout the operation of said machine, a first member of the plurality of members of each of said cam-responsive linkages being rotatable about an axis of rotation and receiving a driving force which is eccentric of said axis of rotation and which is applied by a second member of said plurality of members that is pivotally secured to said first member, said first member responding to said received driving force from said second member to provide a driving force which is eccentric of said axis of rotation and which is applied to a third member of said plurality of members that also is pivotally secured to said first member, means to drive said first, second and third cams so all of said cams move simultaneously and at the same rate, a movable work-holding fixture which is adapted to hold and to move a workpiece, mechanical means that physically synchronize the movement of said movable work-holding fixture with the movement of said cams.

11. A machine wherein a member can be moved relative to a second member, and which comprises a mount for one of said members, a first cam, a first cam-responsive means intermediate said first cam and said mount which can effect a desired movement of said mount, and hence of said one member, relative to the other of said members, a second cam, a second cam-responsive means intermediate said second cam and said mount which can effect a different desired movement of said mount, and hence of said one member, relative to said other member, a third cam, a third cam-responsive means intermediate said third cam and said mount which can effect a further desired movement of said mount, and hence of said one member, relative to said other member, each of said cam-responsive linkages having a plurality of members, and each of said members being resistant to bending and remaining substantially free of bending throughout the operation of said machine, a first member of the plurality of members of each of said cam-responsive linkages being rotatable about an axis of rotation and receiving a driving force which is eccentric of said axis of rotation and which is applied by a second member of said plurality of members that is pivotally secured to said first member, said first member responding to said received driving force from said second member to provide a driving force which is eccentric of said axis of rotation and which is applied to a third member of said plurality of members that also is pivotally secured to said first member, means to drive said first, second and third cams so all of said cams move simultaneously and at the same rate, a movable work-holding fixture which is adapted to hold and to move a workpiece, mechanical means that physically synchronize the movement of said movable work-holding fixture with the movement of said cams, each of said cam-responsive means having a length-adjusting portion which is spaced away from the cam therefor and which is remote from said one member, and said length-adjusting portions being close enough to each other so a person can adjust the lengths of all of said cam-responsive means while remaining in a fixed position.

12. A machine wherein a member can be moved relative to a second member, and which comprises a mount for one of said members, a first cam, a first cam-responsive means intermediate said first cam and said mount which can effect a desired movement of said mount, and hence of said one member, relative to the other of said members, a second cam, a second cam-responsive means intermediate said second cam and said mount which can effect a different desired movement of said mount, and hence of said one member, relative to said other member, a third cam, a third cam-responsive means intermediate said third cam and said mount which can effect a further desired movement of said mount, and hence of said one member, relative to said other member, each of said cam-responsive linkages having a plurality of members, and each of said members being resistant to bending and remaining substantially free of bending throughout the operation of said machine, a first member of the plurality of members of each of said cam-responsive linkages being rotatable about an axis of rotation and receiving a driving force which is eccentric of said axis of rotation and which is applied by a second member of said plurality of members that is pivotally secured to said first member, said first member responding to said received driving force from said second member to provide a driving force which is eccentric of said axis of rotation and which is applied to a third member of said plurality of members that also is pivotally secured to said first member, means to drive said first, second and third cams so all of said cams move simultaneously and at the same rate, a movable work-holding fixture which is adapted to hold and to move a workpiece, mechanical means that physically synchronize the movement of said movable work-holding fixture with the movement of said cams, all of said cams being mounted on a common shaft, a driving shaft which selectively drives said common shaft, said common shaft and said cams being bodily and radially removable from, and bodily and radially replaceable adjacent, said driving shaft to enable said driving shaft to drive said common shaft, and supporting means which provide support for both ends of said common shaft.

13. A machine wherein a member can be moved relative to a second member, and which comprises a mount for one of said members, a first cam, a first cam-responsive means intermediate said first cam and said mount which can effect a desired movement of said mount, and hence of said one member, relative to the other of said members, a second cam, a second cam-responsive means intermediate said second cam and said mount which can effect a different desired movement of said mount, and hence of said one member, relative to said other member, a third cam, a third cam-responsive means intermediate said third cam and said mount which can effect a further desired movement of said mount, and hence of said one member, relative to said other member, each of said cam-responsive linkages having a plurality of members, and each of said members being resistant to bending and remaining substantially free of bending throughout the operation of said machine, a first member of the plurality of members of each of said cam-responsive linkages being rotatable about an axis of rotation and receiving a driving force which is eccentric of said axis of rotation and which is applied by a second member of said plurality of members that is pivotally secured to said first member, said first member responding to said received driving force from said second member to provide a driving force which is eccentric of said axis of rotation and which is applied to a third member of said plurality of members that also is pivotally secured to said first member, means to drive said first, second and third cams so all of said cams move simultaneously and at the same rate, a movable work-holding fixture which is adapted to hold and to move a workpiece, mechanical means that physically synchronize the movement of said movable work-holding fixture with the movement of said cams, a common shaft which supports and rotates all of said cams, a dial with orienting indicia thereon that normally is rotatable with said common shaft and hence with said cams, one or more of said cams being adjustable circumferentially relative to said common shaft and hence relative to said dial to effect a desired orientation of said cams relative to said dial, and hence relative to said common shaft, and said dial being closely adjacent said cams and being accessible to an operator in a position adjacent said cams.

14. A machine wherein a member can be moved relative to a second member, and which comprises a mount for one of said members, a first cam, a first cam-responsive means intermediate said first cam and said mount which can effect a desired movement of said mount, and hence of said one member, relative to the other of said members, a second cam, a second cam-responsive means intermediate said second cam and said mount which can effect a different desired movement of said mount, and hence of said one member, relative to said other member, a third cam, a third cam-responsive means intermediate said third cam and said mount which can effect a further desired movement of said mount, and hence of said one member, relative to said other member, each of said cam-responsive linkages having a plurality of members, and each of said members being resistant to bending and remaining substantially free of bending throughout the operation of said machine, a first member of the plurality of members of each of said cam-responsive linkages being rotatable about an axis of rotation and receiving a driving force which is eccentric of said axis of rotation and which is applied by a second member of said plurality of members that is pivotally secured to said first member, said first member responding to said received driving force from said second member to provide a driving force which is eccentric of said axis of rotation and which is applied to a third member of said plurality of members that also is pivotally secured to said first member, means to drive said first, second and third cams, a movable work-holding fixture which is adapted to hold and to move a workpiece, a first frame that is movable laterally to effect lateral movement of said axis, a second frame that is movable forwardly and rearwardly to effect forward-rearward movement of said axis, a third frame that is movable vertically to effect vertical movement of said welding torch, said first member of each of said cam-responsive means being bodily movable with one of said frames, said second member of each of said cam-responsive means being an elongated member and extending from the cam for said cam-responsive means to said first member of said cam-responsive means, whereby any influence which one cam-responsive means could have on any other cam-responsive means is not material.

15. A welding machine which comprises a mount for a welding torch that is movable in a plurality of directions to permit movement of said welding torch in said plurality of directions, a plurality of cams which can supply forces to move said welding torch in said plurality of directions, a plurality of cam-responsive linkages intermediate said cams and said mount for said welding torch which can respond to said forces supplied to said cams to move said welding torch in said plurality of directions, said cams being remote from said mount and from said welding torch, and adjusting means in said cam-responsive linkages which can adjust the position of said welding torch, all of said adjusting means being readily accessible to an operator of said welding machine while said operator is in a position to view said welding torch, whereby said operator can adjust said adjusting means while viewing said welding torch.

16. A welding machine as claimed in claim 15 wherein said adjusting means are close to said cams, wherein said adjusting means are close to each other, and wherein said adjusting means are substantially identical.

* * * * *